G. A. BADER & C. W. HOWLAND.
LENS CENTERING, MARKING, AND TESTING INSTRUMENT.
APPLICATION FILED SEPT. 12, 1912.
1,134,938.
Patented Apr. 6, 1915.
5 SHEETS—SHEET 1.
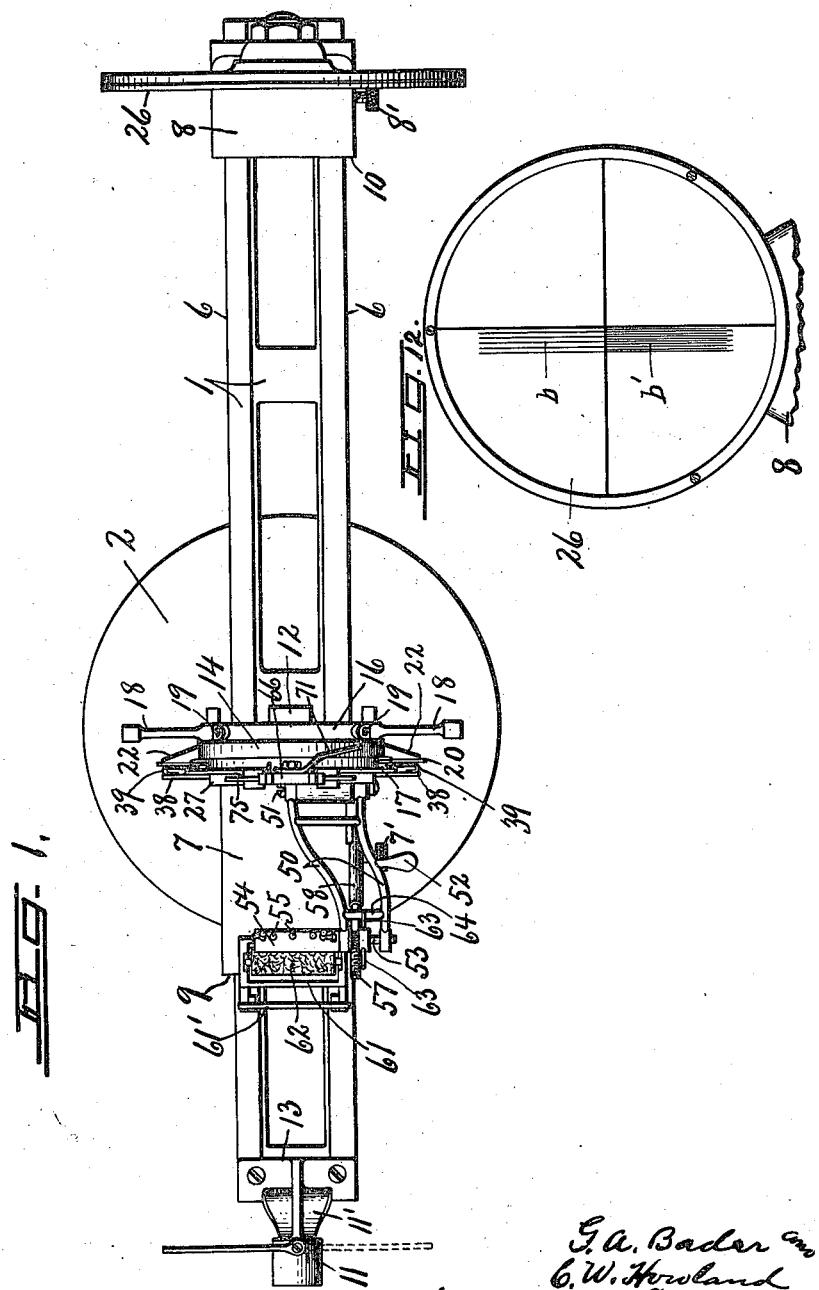

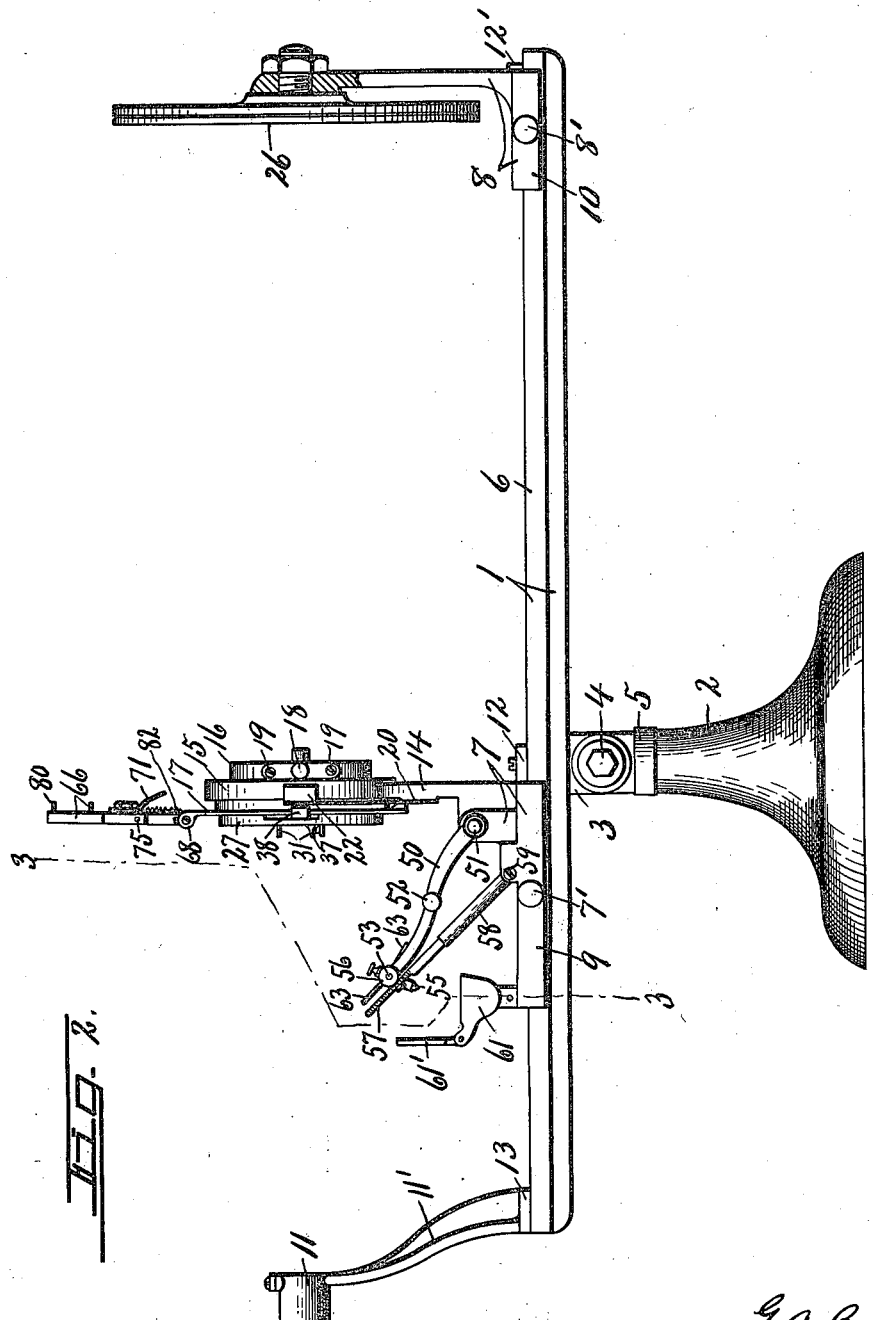

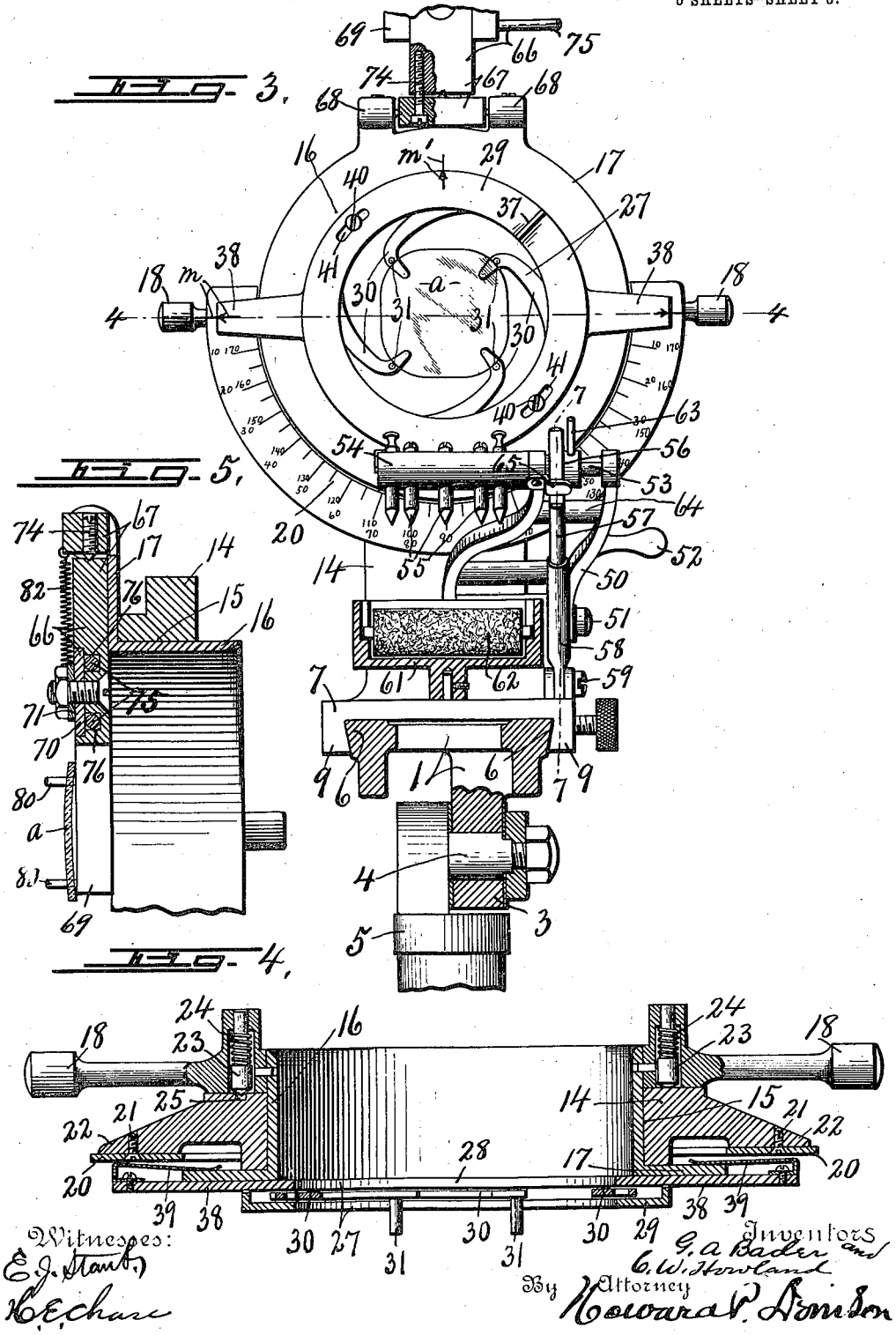

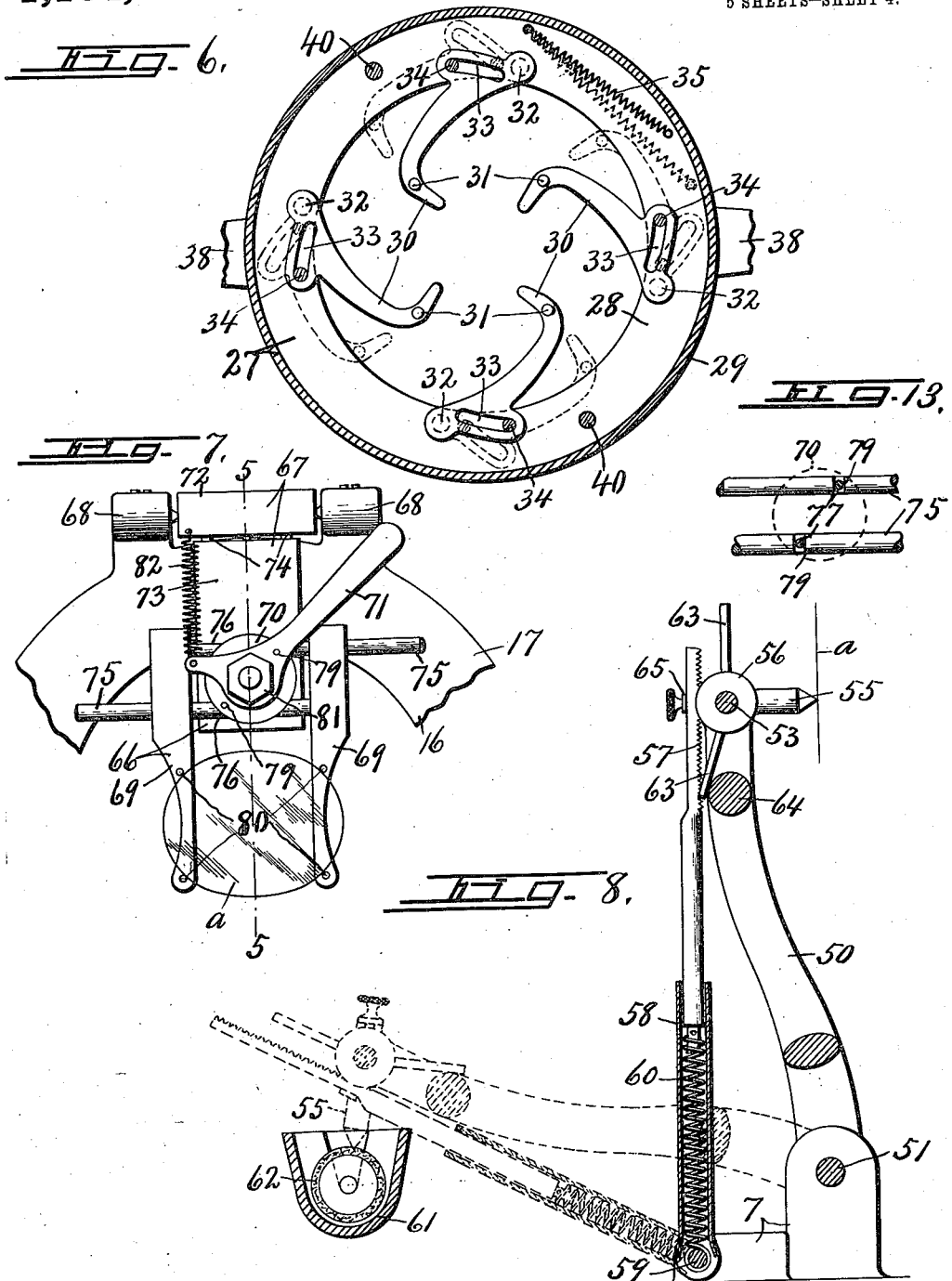

G. A. BADER & C. W. HOWLAND.
LENS CENTERING, MARKING, AND TESTING INSTRUMENT.
APPLICATION FILED SEPT. 12, 1912.
1,134,938.
Patented Apr. 6, 1915.
5 SHEETS—SHEET 5.
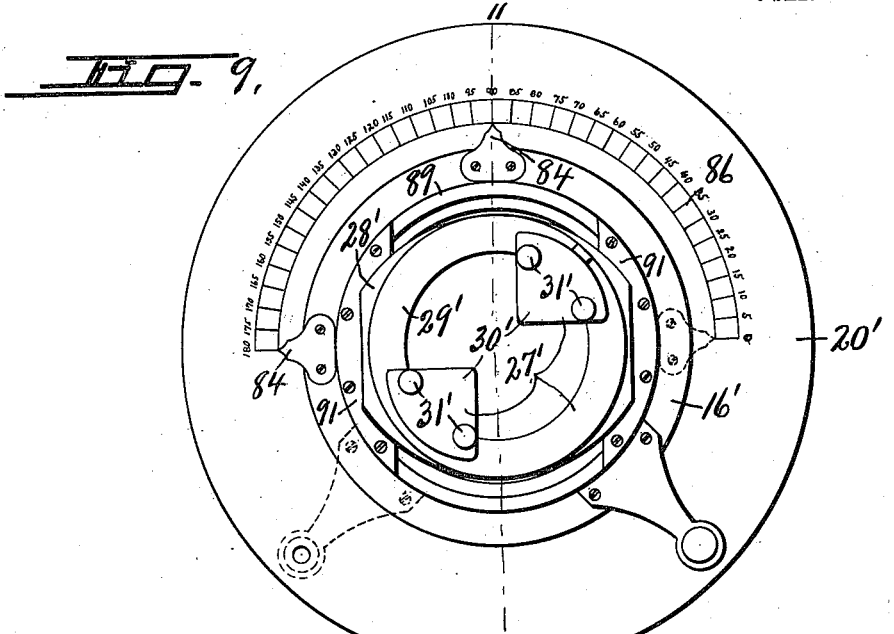
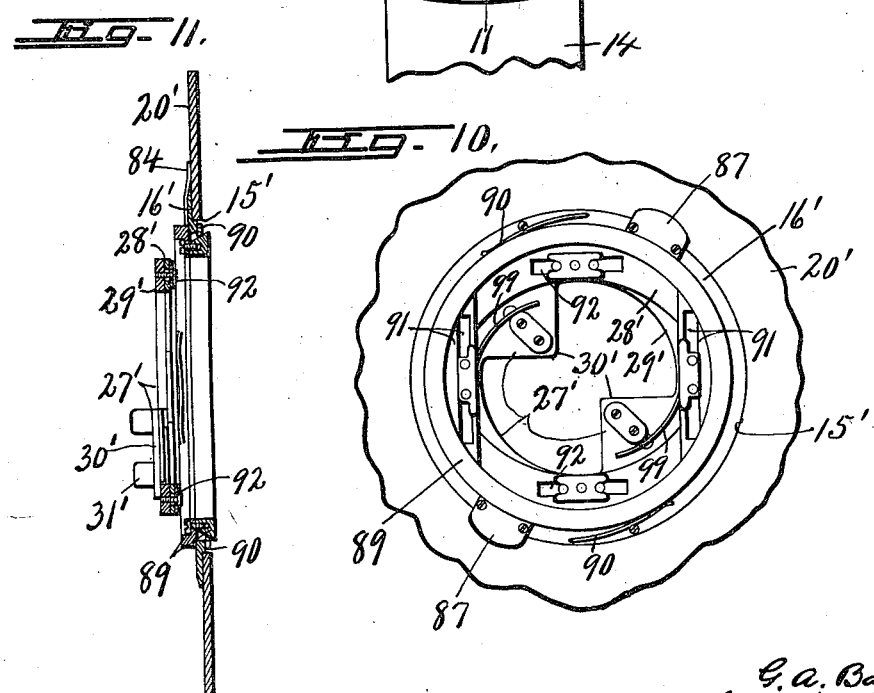

UNITED STATES PATENT OFFICE.

GUSTAV A. BADER, OF ROCHESTER, AND CHAUNCEY W. HOWLAND, OF GENEVA, NEW YORK, ASSIGNORS TO THE STANDARD OPTICAL COMPANY, OF GENEVA, NEW YORK, A CORPORATION OF NEW YORK.

LENS CENTERING, MARKING, AND TESTING INSTRUMENT.

1,134,938.          Specification of Letters Patent.      Patented Apr. 6, 1915.

Application field September 12, 1912. Serial No. 719,949.

*To all whom it may concern:*

Be it known that we, GUSTAV A. BADER and CHAUNCEY W. HOWLAND, of Rochester and Geneva, respectively, in the counties of Monroe and Ontario, respectively, in the State of New York, have invented new and useful Improvements in Lens Centering, Marking, and Testing Instruments, of which the following, taken in connection with the accompanying drawings, is a full, clear, and exact description.

This invention relates to certain improvements in instruments for centering, marking and testing lenses preparatory to cutting and mounting and also in the selection of lenses for certain prescriptions and in verifying the accuracy of finished lenses whether mounted or unmounted.

This device is somewhat similar to that shown in the patent to C. W. Howland, #790,059, May 16, 1905, except that instead of holding and adjusting the lens by hand against a transparent plate between a rotary target and a sight tube as in the Howland device, we have provided a rotary lens holder located between a non-rotatable target and a sight tube and adjustable radially in all directions for the purpose of bringing the center of the lens and its major axis into proper visual registration with the cross lines of the target preparatory to marking.

The main object, therefore, is to enable a lens or lens blank to be more accurately and expeditiously centered and marked with reference to its optical center and axis and to permit the same device to be used for testing, selecting and decentering lenses of various prescribed forms and determining the power or value of prismatic lenses.

Other objects and uses will be brought out in the following description:

In the drawings:—Figures 1 and 2 are respectively a top plan and a side elevation of a lens centering, marking and testing device embodying the various features of our invention. Fig. 3 is an enlarged transverse vertical sectional view of the upper portion of the same device taken on line 3—3, Fig. 2. Figs. 4 and 5 are enlarged sectional views of the lens holders taken respectively on lines 4—4, Fig. 3 and 5—5, Fig. 7. Fig. 6 is a face view, partly in section, of the detached rotary lens holder. Fig. 7 is a front face view of the auxiliary lens clamping device and adjacent portion of its supporting frame shown in Fig. 5. Fig. 8 is an enlarged vertical sectional view of the marking device taken on line 7—7, Fig. 3. Fig. 9 is a front face view of a modified lens holder for centering or properly positioning the lens for marking its optical center and major axis. Fig. 10 is a rear face view of the same lens holding means and adjacent portion of the index plate in which it is mounted. Fig. 11 is a transverse vertical sectional view of the same device taken on line 11—11, Fig. 9. Fig. 12 (Sheet 1) is a front face view of the detached target. Fig. 13 (Sheet 4) is a face view of a portion of the guide rods for the auxiliary lens clamp showing the transverse slots therein and cam pins in section for operating the lens clamping jaws, the cam disk being shown by dotted lines.

This apparatus comprises a main supporting frame or bed —1— rotatably and tiltably mounted upon a suitable supporting base —2—, and for this purpose its intermediate portion is provided with a pendant lug —3— journaled upon a pivotal pin or stud —4— on a rotary head —5—, the latter being journaled upon the upper end of the base —2—, thereby permitting the frame —1— to be rotated horizontally to any angle about its axis or tilted vertically to any angle to and from a horizontal position about the axis of the bearing or stud —4— which is at right angles to the axis of rotation of the rotary head —5—.

The frame or bed —1— extends laterally a considerable distance to either side of the base —2— and is relatively narrow transversely and provided with opposite parallel longitudinal ways —6— which are undercut or dovetailed to form guideways for receiving and supporting superposed carriages —7— and —8—. The carriage —7— is provided at its opposite edges with dovetailed ribs —9— fitting with an easy sliding fit against the ways —6— to hold said carriage in operative position upon the bed and permit it to be moved lengthwise thereof. In like manner the carriage —8— is provided with opposite lengthwise ribs —10— fitting with an easy sliding fit upon the ways —6— to permit longitudinal sliding adjustment thereof along the bed —1—.

The carriage —7— which supports the lens holder and marking device is located between the carriage —8— and a sight tube —11— and is movable between limiting stops —12— and —13— on the frame —1—, said carriage being provided with an upwardly extending arm or bracket —14— having an annular bearing —15— in which is journaled a rotarily adjustable ring —16— having its front end provided with a radially projecting annular flange —17—. The flange —17— bears against the front face of the bearing —15—, while the reduced portion of the ring which is cylindrical and journaled within the bearing —15— extends through and some distance beyond the rear face of the bearing —15— and is provided with diametrically opposite radially projecting arms or handles —18— by which the ring may be rotated, the inner ends of the arms —18— being removably secured by suitable fastening means as screws —19— to the periphery of the rearwardly protruding reduced end of the ring and engage the rear face of the bearing —15— and together with the flange —17— serve to hold the ring against axial movement relatively to its supporting bracket —14— and at the same time to guide the ring —16— in its rotary movement.

The front face of the ring is disposed in a substantially flat plane at right angles to its axis and also at right angles to the plane of the ways —6— along which the bracket —14— with the ring thereon are movable and therefore the axis of the ring is substantially parallel with the ways and directly over the longitudinal center thereof, said flange —17— being provided on its front face with an index preferably centrally in the lower side thereof movable around a concentric graduated plate —20— to enable the operator to read the angle or degree of inclination of the optical axis of the lens under test from its honrizontal or geometrical axis in a manner hereinafter more fully described, the plate —20— being preferably semi-circular and concentric with the lower half of the ring —16— and is secured by suitable fastening means, as screws —21—, to diametrically opposite radially projecting arms —22— on the sides of the bearing —15—.

The ring —16— is frictionally held in a predetermined normal position, with its index registering with the 90 degrees graduation on the index plate —20—, by means of stop pins —23— which are mounted in suitable sockets in the inner ends of the arms —18— and are spring pressed axially of the ring into frictional engagement with the rear face of the bearing —15— by suitable springs —24— as shown more clearly in Fig. 4, said rear face of the bearing —15— being provided with one or more depressions —25— for receiving at least one of the pins —23— when the ring —16— is in its normal position to additionally hold the ring against accidentally shifting rotarily from such normal position.

*Lens holding means.*—Suitable means is provided for holding the lens and adjusting it rotarily and radially in any direction relatively to the axis of the ring —16— for the purpose of centering such lens relatively to the cross lines of a suitable target —26— which is mounted on the carriage —8— some distance to the rear of the lens supporting carriage —7— and is provided with cross lines intersecting each other at right angles, the point of intersection being located in the produced axis of the ring —16—.

In Figs. 1 to 6 inclusive, we have shown a preferred form of lens holder —27— consisting of co-axial rings —28— and —29— operatively connected to each other to maintain their co-axial relation but having their major portions held a sufficient distance apart to receive between them opposite pairs of jaws —30— having lens centering pins —31—, which together with the jaws are movable toward and from each other to clamp and release a lens or lens blank. The outer ends of the jaws are pivoted equi-distant apart at —32— to the ring —28— and are provided with eccentric slots —33— for receiving pins —34— on the ring —29—. The ring —29— is adjustable rotarily relatively to and upon the ring —28— against the action of a retracting spring —35—, thereby shifting the pins —34— along the slots —33— toward the pivots —32— to open the jaws for the reception of a lens or lens blank as —a— between the pins —31—; the front face of the ring —29— being provided with an operating member or finger piece —37— by which it may be rotated by hand. The spring —35— is located in the space between the rings and has one end connected to the ring —28— and its other end connected to the ring —29— so that when the ring —29— is released after being rotated to open the jaws, the spring —35— automatically returns the ring —28— to its normal position or until limited by the engagement of the pins —34— with the outer ends of the slots —33— farthest from their pivots —32—, thereby closing the pins of the jaws upon the lens or lens blank and holding said lens during the adjustment of the lens holder —27— rotarily and transversely of its axis and also while the lens is being marked. One of the rings of the lens holder as —28— is slidable rotarily and radially across and upon the front face of the main supporting ring —16— or rather its flange —17— and is provided with diametrically opposite arms —38— projecting some distance beyond the periphery of the flange —17— to which are secured spring clamping members —39— extending inwardly across and spring tensioned against the rear face of said flange for frictionally retaining the lens holder —27— in any of its adjusted positions and at the same time permitting the entire lens holder to be removed from the flange —17— by withdrawing it radially transversely of the direction of extension of the arms —38— until the inner ends of the springs —39— pass beyond the periphery of the flange —17—, whereupon the holder may be withdrawn in the direction of its axis. The rings —28— and —29— are held in operative relation by screws —40— passing through diametrically opposite slots —41— in the ring —29—, the circumferential length of the slots being substantially equal to the degree of rotary adjustment of the ring —29— necessary to open and close the jaws from one to the other of their extreme positions and together with the screws or pins —40— may serve as stops for limiting the rotary adjustment of the ring —29— in opposite directions. The primary object of this rotary and radial adjustment of the lens or blank is to enable its optical center and axis to be accurately established by comparison with the cross lines of the target when sighting through the tube —11— and then marking the lens in a manner hereinafter described, upon such center and axis. It is evident, however, that this same lens holder may be used to determine the power or value of prisms, decentering and also in testing the accuracy of cut lenses by adjusting it so that its axis is co-incident with that of the ring —16— and its arms —38— in a horizontal position parallel with the horzintal line of the target, in which case the lens clamping pins —31— will be relatively located equidistant from such axis. Then, in testing the accuracy of a lens which may be placed therein, by sighting through the tube —11—, if the cross lines are visually unbroken, it indicates that the optical axis is substantially co-incident with the major geometrical axis, but on the other hand if the lines are visually broken the optical aberration may be detected and corrected by rotating the ring —16— with the lens holder thereon in one direction or the other until the aberration is removed by the unbroken appearance of the lines and the degree of decentering of the optical axis will be indicated by the graduations on the dial plate —20— which shows at a glance the degree of inclination of the optical axis relatively to the major geometrical axis.

The target —26— is fixed to its supporting carriage —8— in a plane at right angles to its axis which is co-incident with that of the lens supporting ring —16— and therefore parallel with the ways —6—, said target being provided with separate series —b— and —b'— of parallel vertical lines located respectively above and below the horizontal cross line, and, in this instance, at the same left-hand side of the vertical cross line, the series of lines —b'—being spaced equi-distant apart in parallel to represent units or degrees of prism power when the target is at a predetermined distance from the lens, while the lines —b— which are also spaced equi-distant apart and parallel represent two degrees or units of prism power at the same predetermined distance from the lens. It therefore follows that at one-half such predetermined distance from the lens, the series —b— will represent units or degrees of prism power and the series —b'— half-units or degrees.

The rearward movement of the carriage —8— is limited by a stop —12'—, while the forward movement is limited by the stop —12—, the object of which is to stop the target at a predetermined focal distance from the plane of the lens when mounted in the holder, and for a similar purpose the rearward movement of the carriage —7— is limited by the stop —12— while its forward movement is limited by the stop —13—. These carriages may be secured at any intermediate position between the stops by set screws —7'— and —8'— which are engaged in threaded apertures in the righthand side of their respective carriages and adapted to engage the adjacent side of the way —6—, thus permitting the securement of the target in any of its adjusted positions to conform to the focus of the lens or lens blank which is being tested or marked, the stops serving also to hold the carriage a fixed distance from the lens for decentering or testing lenses of different prismatic powers.

*Lens marking device.*—The means for marking the lens comprises a rocking frame —50— pivoted at —51— to the carriage —7— below the lens holder and provided with a hand piece —52— by which it may be rocked vertically to and from the lens. Journaled in the upper front end of the frame —50— is a horizontally extending rock shaft or spindle —53— to which is secured a cylinder —54— carrying a series of, in this instance, five radially yielding marking pins —55— having their marking points disposed in the same straight line at one side of the cylinder or barrel —54—. The central marking pin is located in the vertical plane of the line of sight or axis of the ring —16—, while the other pins are located at opposite sides of the central pin but within the margin of an ordinary lens blank which may be placed in the lens holder. The pivot —51— for the rocking frame —50— is disposed nearly directly under the lens holder and the distance between said pivot and axis of the rock shaft —53— is substantially equal to the distance between said pivot and axis of the ring —16— so as to cause the pins —55— to mark the optical center and axis of the lens blank in a manner presently described.

Secured to the rock shaft —53— at the outer end of the barrel —54— is a gear or knurled head —56— meshing with a toothed rack —57— having one end slidable telescopically within a tubular support —58— as shown more clearly in Fig. 8, the lower end of said tubular support being pivoted at —59— upon the carriage —7— some distance in front of the pivot —51— of the rocking frame —50—. Within this tubular support —58— is a coiled spring —60— having its lower end secured to the pivot —59— and its upper end attached to the lower end of the rack —57— and together with the rack and pinion serve to rock the shaft —53— and its barrel —54— together with the pins —55— through approximately one-quarter turn so that when the frame —50— is in its extreme down position, the pins —55— will point downwardly and when rocked upwardly to its extreme up position, the points of the pins will face and come in contact with the front face of the lens on the holder —27—.

An ink reservoir —61— containing an ink pad or roller —62— is secured to the front end of the carriage —7— a suitable distance in front of the rocking frame —50— to permit contact of the points of the pins with the ink pad when the frame is rocked downwardly to the position shown by dotted lines in Fig. 8.

The spring —60— is normally tensioned so as to hold the frame —50— and marker pins carried thereby in an intermediate position but below the plane of the lens when mounted in the holder so as not to obscure the scope of vision in sighting through the tube and lens to the target.

The degree of rocking movement of the barrel —54— and its marking pins is limited by stop pins —63— projecting from opposite sides of the head —56— and adapted to engage opposite sides of a cross bar —64— on the frame —50—, as shown more clearly in Fig. 8.

The toothed rack —57— is held in operative engagement with the pinion —56— by means of a back rest —65— shown in Figs. 3 and 8 and by tensioning the spring in the manner just previously described, it is evident that when the frame —50— is rocked toward the ink pad, the spring —60— will be under compression and when moved to its marking position it will be under tension, thereby assuring the full rocking movement of the markers from one extreme position to the other as limited by the stop pins —63—.

The ink reservoir —61— may be closed when not in use by a suitable cover —61'—.

The sight tube —11— is secured to the upper end of a bracket —11'— which in turn is preferably rigidly secured to the front end of the frame —1—, said tube having its sight opening in the produced axis of the ring —16— and target.

If desired the lens holder —27— may be removed in the manner previously described and an auxiliary lens holder —66— used in testing cut or finished lenses, and one of the distinctive features of this auxiliary lens holder is that it is hinged to the flange of the ring —16— in such manner as to bring the lens in exactly the same transverse vertical plane as that in which the lens is supported by the holder —27— so that after a lens has been properly centered and marked in the holder —27— and afterward cut according to such marking, the testing of the same cut lens in the auxiliary holder —66— will not show any visual aberration or broken lines on the target as would be the case if the lens were marked in one plane and cut according to such marking and then tested in another plane. This auxiliary lens holder comprises a vertically rocking frame —67— pivoted at one end to and between suitable bearings —68— on the upper side of the periphery of the flange —17— of the ring —16— and having its opposite end adapted to carry a pair of oppositely arranged lens clamping jaws —69— and suitable operating means as a cam —70— and levers —71—. The frame —67— is composed of a base section —72— which is pivoted directly to the bearings —68— and an adjustable section —73— connected to the section —72— by adjusting screws —74—, whereby the lens clamps may be properly adjusted for supporting the lens with its optical center in exact co-incidence with that of the ring —16— and target. The jaws —69— are provided with guide rods —75— disposed one above the other in horizontal recesses or ways —76— in the front face of the frame section —73— when the latter is in operative position, said jaws being located at opposite sides of the frame section —73—. The guide rod —75— of each jaw extends laterally through its corresponding guide opening or way —76— and also through a registering aperture in the opposite jaw, said guide rods being provided with vertical grooves —77— in their front sides for receiving pins —79— on the cam —70— so that when said cam is rotated by the lever —71—, the pins —79— engaging in the slots or grooves —77— in the rods —75— will impart the same degree of lateral movement to each of the jaws —69— in opposite directions. Each jaw is provided with a pair of lens clamping pins —80— projecting forwardly therefrom for engaging the periphery of the lens and holding it in proper position for testing and marking with its optical center in exact alinement with that of the ring —16— and target.

The lever —71— is locked to the disk —70— by one of the pins —79— and a suitable clamping nut —81— and it together with the disk are returned to their normal positions by means of a retracting spring —82— to hold the jaws —69— in their extreme inward positions ready to be opened to receive various sizes of lenses by simply rocking the lever upwardly against the action of the spring —82—, thus holding the lens on the holder under yielding pressure. The lens holder —27—, as previously intimated, may, however, be utilized for the same purposes as the auxiliary lens holder by simply positioning it with its axis co-incident with that of the ring —16— in which it is mounted.

In Figs. 9, 10 and 11 we have shown a modified form of lens holder to take the place of the holder —27— and it consists of a plate —20'— adapted to be secured in any suitable manner to the frame —14— somewhat similar to that shown for securing the plate —20— to said frame except that it is provided with a circular opening or bearing —15'— registering and concentric with the opening in the bearing —15— to receive and support a rotarily adjustable ring —16'— corresponding to the ring —16—, said ring being provided with one or more, in this instance two, indexes or pointers —84— spaced 90° apart and movable around concentric graduations —86— on the front face of the plate —20'—, one of the pointers registering with the zero or 180° mark at one or either side of the plate, while the other pointer registers with the 90° graduation. The front face of the ring 16' is somewhat larger than the opening 15' and constitutes an annular shoulder for preventing rearward displacement of the ring through the opening while the rear side of the ring is provided with one or more radially projecting ears or flanges —87— engaging the rear face of the plate to hold it against forward displacement. Mounted within and upon this ring —16'— is a lens holder —27'— which is adjustable rotarily and radially in all directions relatively to the axis of the ring and comprises relatively movable sections —28'— and —29'— and suitable connections between the section —28'— and ring —16'— whereby both sections may be moved simultaneously relatively to the ring —16'— or said ring together with the lens holder rotated relatively to the graduated plate —86—. The connection between the ring —16'— and lens holding section —28'— consists of a ring —89— journaled in the opening in the ring —16'— and held in place by two or more springs —90— which enter annular grooves in the periphery of said ring —89— as shown more clearly in Figs. 10 and 11. The front end of this ring —89— is provided with diametrically opposite slotted ways —91— parallel with each other and with which the diametrically opposite sides of the sections —28'— are slidably interlocked to move diametrically or radially of both rings —16'— and —89—. In like manner the section —28'— is provided with diametrically opposite slotted ways —92— with which diametrically opposite sides of the section —29'— are slidably interlocked, as shown more clearly in Fig. 10, the ways —92— being parallel and disposed at substantially right angles to the ways —91— so as to permit diametrical or radial movement of the section —29'— at right angles to that of the section —28— although both sections may be moved in the direction of extension of the ways —91—. The section —29'— is provided with a pair of diametrically opposite lens clamping jaws —30'— slidably interlocked therewith for radial movement toward and from each other, each jaw being provided with a pair of lens clamping pins —31'— and is spring pressed toward the other for causing the pins to yieldingly engage the periphery of the lens to hold it in operative position for centering, marking or testing with relation to the target. The jaws —30'— are spring pressed toward each other to yieldingly engage the periphery of a lens by springs —99— and serve to hold the lens in a plane at substantially right angles to the focal axis and centrally of the ring upon which the jaws are mounted.

It will be observed that in both forms of lens holders, the jaws are provided with back rests for the lens while being held between the clamping pins, thereby assuring a firm support for the lens without obscuring the line of vision therethrough.

If desired the radially adjustable parts of the lens holder and rotary support therefor may be provided with suitable marks as —m— and —m'— adapted to be brought into registration with each other as shown in Fig. 3 to center the radially movable parts of the lens holder as —27— with its supporting ring as —16— particularly when it is desired to use this lens holder for testing finished lenses or for testing the power or value of prismatic lenses, in which case it will perform the same function as the auxiliary lens holder —66—, permitting the latter to be dispensed with if desired.

The operation of our invention will now be readily understood upon reference to the foregoing description in connection with the accompanying drawings, and although the specific forms of lens holders herein shown and described are preferable, we do not wish to limit ourselves to such construction nor to the details of any of the other mechanisms herein illustrated. It is understood, however, that the primary object of the lens holder —27— is to properly hold and adjust uncut or irregularly edged lenses for proper marking by the marking devices while the primary use of the lens holder —66— is for holding, adjusting and testing regular or irregular lenses.

What we claim is:

1. In an apparatus of the character described, a lens adjusting device comprising a ring adjustable rotarily about its axis and having an independent adjustment transversely of such axis, and lens clamping jaws movably mounted on the ring to close and open upon and from the lens.

2. In an apparatus of the character described, a lens adjusting device comprising a rotarily adjustable member, a support therefor, and a lens holder mounted on said member and adjustable radially in any direction relatively thereto.

3. In an apparatus of the character described, a lens adjusting device comprising two rings one of which is rotatable, the other ring having an independent adjustment transversely of the axis of the rotary ring, and lens clamping jaws mounted on the transversely adjustable ring.

4. In an apparatus of the character described, a lens adjusting device comprising two rings one of which is adjustable rotarily, the other ring having in independent adjustment transversely of the axis of the rotary ring, lens clamping jaws mounted on the transversely adjustable ring, and means for frictionally holding the last named ring in its adjusted position.

5. In an apparatus of the character described, a lens adjusting device comprising two members, one of which is adjustable rotarily, the other member having an independent adjustment transversely of the axis of the rotary member, lens clamping jaws mounted on the transversely adjustable member, and spring clamping means on one of the members for holding the other member in its adjusted position.

6. In an apparatus of the character described, a lens adjusting device comprising two rings one of which is adjustable rotarily, the other ring having an independent adjustment transversely of the axis of the rotary ring, lens clamping jaws mounted on the transversely adjustable ring, and a graduated scale concentric with said axis for indicating the degree of adjustment of the rotary ring from a predetermined position.

7. In an apparatus of the character described, a lens adjusting device comprising a supporting member, a ring adjustable rotarily upon said member and having an independent adjustment transversely of its axis of rotation, lens clamping jaws mounted on said ring, and means also mounted on the ring for opening and closing the jaws.

8. In an apparatus of the character described, a lens adjusting device comprising a lens holder adjustable rotarily and having an independent adjustment transversely of its axis of rotation, said lens holder having relatively movable lens clamping jaws, and means for opening the jaws simultaneously.

9. In an apparatus of the character described, a lens adjusting device comprising a frame having a circular opening, a ring adjustable rotarily in said opening, a graduated scale on the frame for indicating the degree of such rotary adjustment from a predetermined position, a lens holder mounted on said ring and adjustable transversely of its axis, and clamping means for frictionally holding the lens holder in its adjusted position.

10. In an apparatus of the character described, a lens adjusting device comprising a frame having a circular opening, a ring adjustable rotarily in said opening, a separate ring adjustable upon the first named ring transversely of its axis, lens clamping jaws pivotally mounted on the second named ring, an additional ring mounted upon the second named ring and adjustable rotarily relatively thereto, connections between the last named ring and lens clamping jaws for opening the latter when said last named ring is rotated in one direction, and means for returning the last named ring to close the jaws upon the lens.

11. In an apparatus of the character described, a lens adjusting device comprising a frame, a rotarily adjustable member mounted on the frame, a ring mounted on said member to rotate therewith and having an independent adjustment transversely of the axis of rotation, means for frictionally holding said ring and member against accidental relative rotation, lens clamping jaws mounted on the ring, and spring actuated means for closing the jaws upon a lens, said means being adjustable manually against the action of the spring for opening the jaws.

12. In a apparatus of the character described, a non-rotatable frame, a ring journaled on the frame for rotary adjustment, movable means for locking the ring in its adjusted position, a separate ring mounted on the second named ring to rotate therewith and having an independent adjustment transversely of the axis of rotation, means for frictionally holding the second named ring in its adjusted position, lens clamping jaws mounted on the second named ring, and spring actuated means for closing the jaws upon a lens.

13. In an apparatus of the character described, a lens adjusting device comprising a rotary supporting member, a lens holder adjustable transversely of the axis of rotation of said member, said lens holder being provided with lens clamping jaws and means for withdrawing said jaws from their clamping positions, and an auxiliary lens holder mounted on said member and movable to and from a position across the axis of rotation of the first named lens holder in such maner as to bring the lens thereon in the same transverse plane as that in which it would be held by the jaws of said first named holder.

14. In an apparatus of the character described, a supporting frame, a ring adjustable rotarily upon the frame, a lens holder mounted upon the ring and adjustable transversely of its axis of rotation and provided with lens clamping jaws and means for withdrawing the jaws from their clamping positions, and an auxiliary lens holder pivoted to the ring to swing to and from a position across the opening therethrough.

In witness whereof we have hereunto set our hands on this tenth day of August 1912.

GUSTAV A. BADER.
CHAUNCEY W. HOWLAND.

Witnesses:
ERASTUS HOPKINS,
WILLIAM J. ESPEY.